United States Patent
Donley et al.

(10) Patent No.: US 11,246,002 B1
(45) Date of Patent: Feb. 8, 2022

(54) DETERMINATION OF COMPOSITE ACOUSTIC PARAMETER VALUE FOR PRESENTATION OF AUDIO CONTENT

(71) Applicant: Facebook Technologies, LLC, Menlo Park, CA (US)

(72) Inventors: Jacob Ryan Donley, Kirkland, WA (US); Paul Thomas Calamia, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 90 days.

(21) Appl. No.: 16/880,988

(22) Filed: May 22, 2020

(51) Int. Cl.
*H04S 7/00* (2006.01)
*H04R 1/40* (2006.01)

(52) U.S. Cl.
CPC ............ *H04S 7/30* (2013.01); *H04R 1/406* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 10,798,511 B1* | 10/2020 | Sheaffer | H04S 5/00 |
| 2008/0069366 A1* | 3/2008 | Souldore | H04S 7/301 |
| | | | 381/63 |
| 2015/0256956 A1* | 9/2015 | Jensen | H04R 29/005 |
| | | | 381/56 |
| 2016/0118038 A1* | 4/2016 | Eaton | G10L 21/0208 |
| | | | 381/63 |
| 2018/0020312 A1* | 1/2018 | Visser | G06F 3/017 |
| 2018/0240471 A1* | 8/2018 | Markovich Golan | |
| | | | G10L 21/0232 |
| 2019/0080709 A1* | 3/2019 | Wolff | H04R 5/027 |

* cited by examiner

*Primary Examiner* — Paul W Huber
(74) *Attorney, Agent, or Firm* — Fenwick & West LLP

(57) ABSTRACT

Determination of a composite acoustic parameter value for a headset is presented herein. A directionally enhanced audio signal is generated based on audio signals from an acoustic sensor array and a spatial signal enhancement filter that is directed for enhancement of a sound source. A SNR improvement value is determined based on a SNR value of the directionally enhanced audio signal and a SNR value of an audio signal from an acoustic sensor of the acoustic sensor array. The SNR improvement value is input into a model that maps SNR improvement values to spatial acoustic parameters to determine a spatial acoustic parameter. A temporal acoustic parameter is determined based on the audio signals. The composite acoustic parameter value is determined based on the spatial acoustic parameter and a temporal acoustic parameter value. Audio content presented to a user is adjusted based in part on the composite acoustic parameter value.

20 Claims, 7 Drawing Sheets

500

Obtain a directionally enhanced audio signal generated using audio signals from an acoustic sensor array
510

Determine a signal-to-noise ratio (SNR) improvement value of the acoustic sensor array based in part on the directionally enhanced audio signal and an audio signal from an acoustic sensor of the acoustic sensor array
520

Determine a spatial acoustic parameter based in part on the SNR improvement value and a model that maps SNR improvement values to spatial acoustic parameters
530

Determine a temporal acoustic parameter based in part on the audio signals
540

Determine a composite acoustic parameter value based in part on the spatial acoustic parameter and a temporal acoustic parameter value
550

DETERMINATION OF COMPOSITE ACOUSTIC PARAMETER VALUE FOR PRESENTATION OF AUDIO CONTENT

BACKGROUND

The present disclosure relates generally to presentation of audio content, and specifically relates to determination of a composite acoustic parameter value for adjusting audio content presented to a user.

In an artificial-reality environment, simulating sound propagation from an object to a listener may use knowledge about acoustic properties of the room. The acoustic properties of the room can be related to direct-to-reverberant ratio and early-to-late energy ratio of the room. Also, direct-to-reverberant ratio (DRR) and early-to-late energy ratio (ELR) are important for algorithms used for sound enhancement and algorithms for presenting virtual and augmented sound. These algorithms usually cannot resolve the directional components of the late/reverberant component of sound propagation, resulting in the late/reverberant component being a residual error in the output of the algorithms. Therefore, improved technologies for determining direct-to-reverberant ratio and early-to-late energy ratio are needed.

SUMMARY

Embodiments of the present disclosure support a method, computer readable medium, and apparatus for determining a composite acoustic parameter value for adjusting audio content presented to a user (e.g., via an audio system on a headset).

In some embodiments, a directionally enhanced audio signal is generated using audio signals from an acoustic sensor array. A signal-to-noise ratio (SNR) improvement value is determined based in part on the directionally enhanced audio signal and an audio signal from an acoustic sensor of the acoustic sensor array. A spatial acoustic parameter is determined based in part on the SNR improvement value and a model that maps SNR improvement values to spatial acoustic parameters. A composite acoustic parameter value is determined based in part on the spatial acoustic parameter and a temporal acoustic parameter value. The composite acoustic parameter value can be a direct-to-reverberant ratio (DRR) or early-to-late energy ratio (ELR). Audio content presented to a user is adjusted based in part on the composite acoustic parameter value.

In some embodiments, a directionally enhanced audio signal is generated using audio signals from an acoustic sensor array. A composite acoustic parameter is determined based in part on a spatial acoustic parameter and a temporal acoustic parameter. The spatial acoustic parameter is determined based in part on the directionally enhanced audio signal and an audio signal of an acoustic sensor of the acoustic sensor array. The temporal acoustic parameter is determined based in part on an impulse response of a local area. Audio content is adjusted based in part on the composite acoustic parameter value. The adjusted audio content is presented to a user.

BRIEF DESCRIPTION OF THE DRAWINGS

FIG. 5 is a flowchart illustrating a method of determining a composite acoustic parameter value, in accordance with one or more embodiments.

Figure 1A:
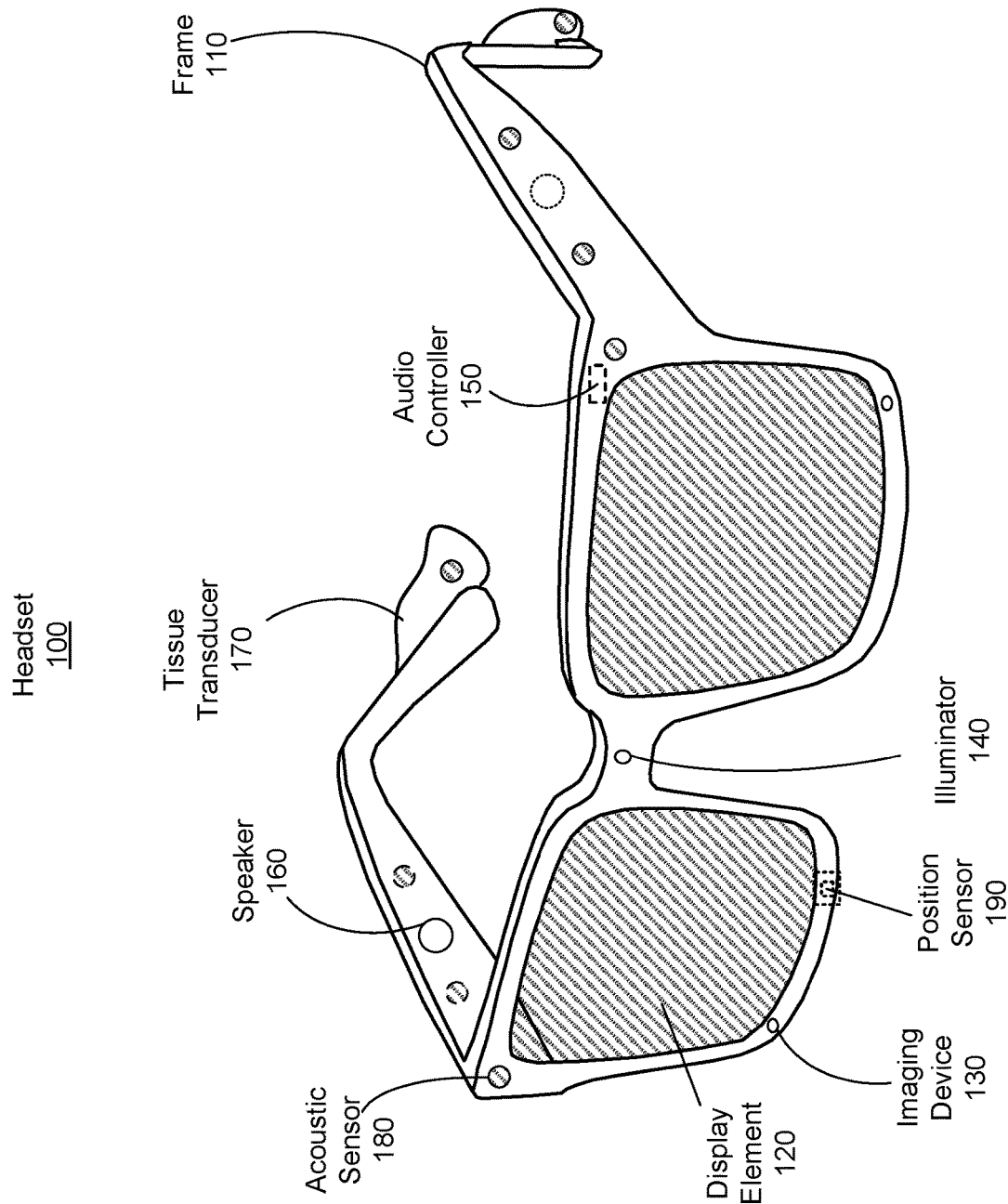
FIG. 1A is a perspective view of a headset implemented as an eyewear device, in accordance with one or more embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a headset, a head-mounted display (HMD) connected to a host computer system, a standalone HMD, a near-eye display (NED), a mobile device or computing system, or any other hardware platform capable of providing artificial reality content to one or more viewers.

An audio server that determines a composite acoustic parameter value of a local area is presented herein. The local area can be a room, an open space, or other types of space. The composite acoustic parameter value can be a DRR value, ELR value, or a combination of both. DRR is a ratio of energy of direct sound to energy of reverberation. ELR is a ratio of energies of early reflections to energies of late reflections (e.g., reflections arriving after a critical delay time). The audio server determines the composite acoustic parameter value by combining a spatial acoustic parameter (e.g., a spatially derived DRR or ELR) and a temporal acoustic parameter (e.g., a temporally derived DRR or ELR). The audio server determines the spatial acoustic parameter by computing a signal-to-noise ratio (SNR) improvement value of an acoustic sensor array in the local area. The acoustic sensor array includes a plurality of acoustic sensors for detecting sound in the local area. The SNR improvement value can be a difference between a SNR value of an enhanced audio signal from the acoustic sensor array and a SNR value of an audio signal from one of the plurality of acoustic sensors in the acoustic sensor array. The enhanced audio signal is generated by directing a spatial signal enhancement filter at a sound source in the local area for enhancement of the sound source. The audio server inputs the SNR improvement value into a model that maps SNR improvement values to spatial acoustic parameters. The model outputs the spatial acoustic parameter. The audio server can assign a weight to the spatial acoustic parameter ("spatial weight") and another weight to the temporal acoustic parameter ("temporal weight"), e.g., based on characteristics of the acoustic sensor array and/or the local area. The audio server combines the spatial and temporal acoustic parameters based on the two weights to generate the composite acoustic parameter value.

The spatial acoustic parameter describes acoustic properties of the local area in the space-domain, and the temporal acoustic parameter describes the acoustic properties of the local area in the time-domain. For room acoustic properties, the space-domain and time-domain are strongly interconnected. Thereby, compared with either the spatial acoustic parameter or the temporal acoustic parameter, the composite acoustic parameter is a better estimation of acoustic properties of the local area.

The composite acoustic parameter value is used for adjusting audio content presented to a user, e.g., through a headset worn by the user. For instance, the audio server can send the composite acoustic parameter value and/or other acoustic parameters to the headset for the headset to render the audio content. One or more of the other acoustic parameters can be generated based on the composite acoustic parameter value. The audio server can also use the composite acoustic parameter value and/or the other acoustic parameters to update a virtual model of the local area, and the headset can render the audio content based on information from the updated virtual model. Rendering and presentation of the audio content can be done through an audio system communicatively implemented on the headset and coupled to the audio server. In some embodiments, the audio content is spatialized audio content. Spatialized audio content is audio content that is presented in a manner such that it appears to originate from one or more points in an environment surrounding the user (e.g., from a virtual object in a local area of the user) and propagate toward the user.

FIG. 1 is a perspective view of a headset 100 implemented as an eyewear device, in accordance with one or more embodiments. In some embodiments, the eyewear device is a NED. In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame 110, and may include, among other components, a display assembly including one or more display elements 120, a depth camera assembly (DCA), an audio system, and a position sensor 190. While FIG. 1 illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1 shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array (also referred to as "acoustic sensor array"), and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The audio controller 150 renders audio content based on acoustic parameters of a local area of the headset 100. The local area can be a room, such as conference room, a theater, a game room, a bathroom, a hallway, an office, a bedroom, a dining room, a living room, or other types of room. An acoustic parameter defines an acoustic property of the local area. The acoustic parameters of the local area include a composite acoustic parameter, such as a composite DRR or composite ELR. The acoustic parameters can also include reverberation time, impulse response, etc. The audio controller 150 can either determine the acoustic parameters, receive the acoustic parameters from an audio server associated with the headset 100, or some combination thereof. In some embodiments, the audio content is presented by the transducer array. The audio controller 150 can render the audio content to make it spatialized, such that the audio content appears to originate from a target region in the local area.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIGS. 2 and 6.

Figure 1B:
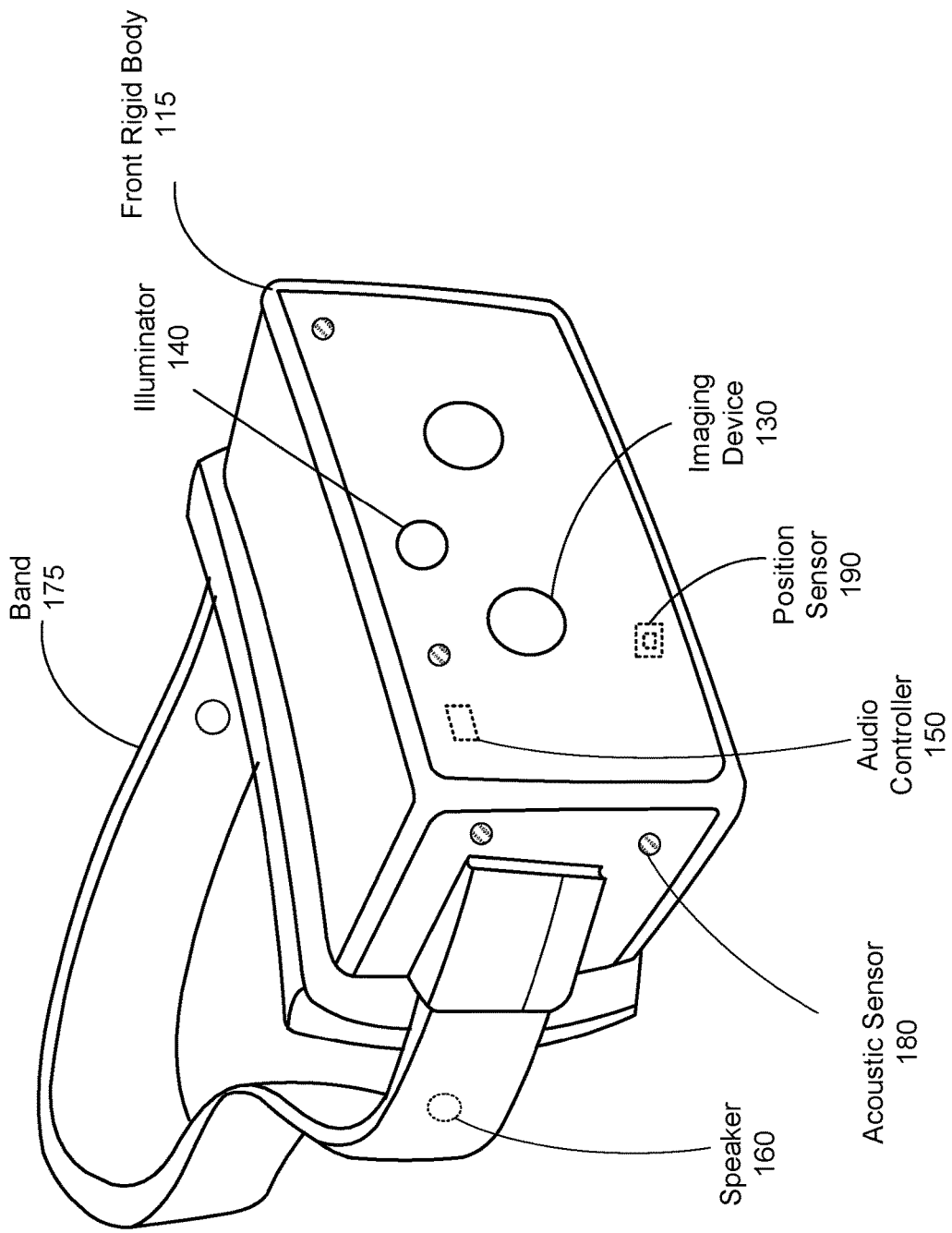
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 190. FIG. 1B shows the illuminator 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
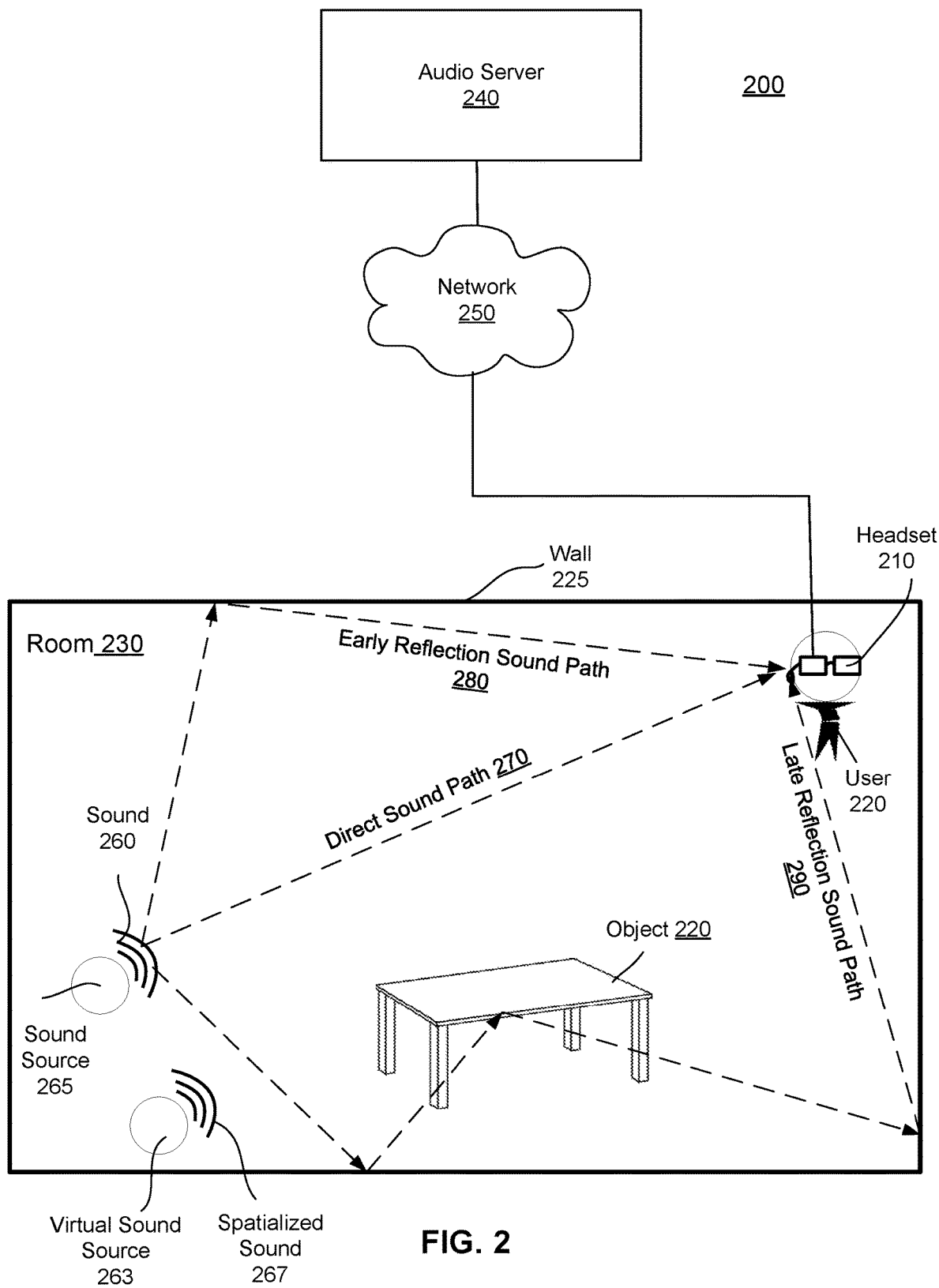
FIG. 2 is a block diagram of a system environment for a headset, in accordance with one or more embodiments.

FIG. 2 is a block diagram of a system environment 200 for a headset 210, in accordance with one or more embodiments. The system environment 200 includes the headset 210 that can be worn by a user 220 in a room 230. The room 230 may be a conference room, a theater, a game room, a bathroom, a hallway, an office, a bedroom, a dining room, a living room, or other types of room. In some embodiments, the room 230 can be other types of space, such as open amphitheater, field, etc. The system environment 200 also includes an audio server 240 and a network 250.

The network 250 connects the headset 210 to the audio server 240. The network 250 may include any combination of local area and/or wide area networks using both wireless and/or wired communication systems. For example, the network 250 may include the Internet, as well as mobile telephone networks. In one embodiment, the network 250 uses standard communications technologies and/or protocols. Hence, the network 250 may include links using technologies such as Ethernet, 802.44, worldwide interoperability for microwave access (WiMAX), 2G/3G/4G/5G mobile communications protocols, digital subscriber line (DSL), asynchronous transfer mode (ATM), InfiniBand, PCI Express Advanced Switching, etc. Similarly, the networking protocols used on the network 250 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 250 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The network 250 may also connect multiple headsets located in the same or different rooms to the same audio server 240.

The headset 210 presents media to a user. In one embodiment, the headset 210 may be, e.g., a NED or an HMD. An embodiment of the headset 210 is the headset 100 in FIG. 1. In general, the headset 210 may be worn on the face of a user such that content (e.g., media content) is presented using one or both lens of the headset. However, the headset 210 may also be used such that media content is presented to a user in a different manner. Examples of media content presented by the headset 210 include one or more images, video content, audio content, or some combination thereof.

The headset 210 may include at least one depth camera assembly (DCA) and/or at least one passive camera assembly (PCA). A DCA generates depth image data that describes the 2D geometry for some or all of the room 230, and a PCA generates color image data for some or all of the room 230. In some embodiments, the DCA and the PCA of the headset 210 are part of simultaneous localization and mapping (SLAM) sensors mounted on the headset 210 for determining visual information describing some or all of the room 230. Thus, the depth image data captured by the at least one DCA and/or the color image data captured by the at least one PCA can be referred to as visual information determined by the SLAM sensors of the headset 210.

The headset 210 may also include position sensors or an inertial measurement unit (IMU) that tracks the position (e.g., location and pose) of the headset 210 within the room 230. The headset 210 may also include a Global Positioning System (GPS) receiver to further track location of the headset 210 within the room 230. The position (includes orientation) of the headset 210 within the room 230 is referred to as location information of the headset 210.

Furthermore, the headset 210 includes an audio system. An embodiment of the audio system is the audio system 200 described above in conjunction with FIG. 2. The audio system may measure audio data in the room 230 (e.g., using an acoustic sensor array and transducer array). Audio data includes, e.g., a reverberation time as measured/determined by the audio system from a particular position within the room 230. The audio system may generate and/or store information of the audio content includes, e.g., information describing a location of a sound source (e.g., sound source 265) of the audio content.

The sound source 265 is a real sound source that projects sound 260 into the room 230. The sound 260 can be used for determining acoustic parameters (e.g., a composite acoustic parameter) of the room 230. Acoustic parameters are parameters describing acoustic parameters of the room 230 that may be used by the audio system to render audio content. The composite acoustic parameter is a combination of a spatial acoustic parameter and a temporal acoustic parameter. The audio system can determine a location of the sound source 265 in the room 230 based on the sound. Using the location of the sound source 265, the audio system can use a spatial signal enhancement filter to enhance sound from the sound source 265 to create a directionally enhanced audio signal. In some embodiments, the audio system uses the directionally enhanced audio signal to determine a composite acoustic parameter. In some embodiments, the audio system provides information to the audio server 240 for the audio server 240 to determine the composite acoustic parameter, which may then be provided to the audio system. The information provided to the audio server 240 may include, e.g., directionally enhanced audio signal, visual information of the room 230, location information of the headset 210, other information related to determining the composite acoustic parameter, or some combination thereof.

The sound 260 includes a direct portion, an early reflection portion (e.g., the first order acoustic reflections from nearby surfaces), and a late reflection portion (also referred to as "reverberant portion," e.g., the first order acoustic reflections from farther surfaces or higher order acoustic reflections). Propagation paths of the sound 260 include a direct sound path 270 corresponding to the direct portion of the sound 260, an early reflection sound path 280 corresponding to the early reflection portion of the sound 260, and a late reflection sound path 290 corresponding to the late reflection portion of the sound 260. The direct sound path 270 is a path from the sound source 265 to the (e.g., right) ear of the user 220 without reflection. The early reflection sound path 280 is a path from the sound source 265 to the (e.g., right) ear of the user 220 with reflection by a wall 225 of the room 200. The late reflection sound path 290 is a path from the sound source 265 to the (e.g., right) ear of the user 220 with reflection by the wall 225, then reflection by an object 220 in the room 200, and another reflection by the wall 225.

The direct and early reflection portions of the sound 260 can be resolved in the space-domain. For instance, the direct and early reflection portions can be resolved based on the directionally enhanced audio signal from an acoustic sensor array of the audio system and an audio signal from an acoustic sensor in the acoustic sensor array. The direct and early reflection portions of the sound 260 can also be resolved in the time-domain, e.g., by measuring decay of the reverberation level relative to the direct portion and/or the early reflection portion to determine an ELR. The late reflection portion of the sound 260 is considered to be diffuse and pseudo-randomly distributed in space and therefore, the late reflection portion is hard to be resolved spatially. However, the time-domain and space-domain diffuse sound fields are strongly interconnected, and combining the two (e.g., determining the composite acoustic parameter by combining the spatial acoustic parameter and the temporal acoustic parameter) can result in an improved estimation of room acoustic properties.

The audio system can also present spatialized sound to the user 220 based on one or more acoustic parameters (e.g., the composite acoustic parameter) of the room 230 so that the spatialized sound appears to originate from a real object in the room 230. For example, the audio system may use the one or more acoustic parameters, head-related transfer functions (HRTFs), and convolution to render spatialized sound 267. The spatialized sound 267 appears to the user 220 that it is originated from the location of the virtual sound source 263 in the room 230. The spatialized sound 267 is rendered to include a direct portion, an early reflection portion, and a late reflection portion. Virtual propagation paths of the spatialized sound 267 include a direct path, early reflection path, and a late reflection path. The virtual sound source 263 can be a real object in the room 230 or a virtual object. In some embodiments, the audio system obtains the acoustic parameters of the room 230 from the audio server 240.

The audio server 240 determines a composite acoustic parameter value of the room 230 that can be used for rendering audio content presented by the headset 210. The composite acoustic parameter value can be a value of DRR or ELR. To determine the composite acoustic parameter value, the audio server 240 obtains a directionally enhanced audio signal using audio signals from an acoustic sensor array and a spatial signal enhancement filter that is directed at a sound source within the room 230. In some embodiments, the audio server 240 generates the directionally enhanced audio signal. In some other embodiments, the audio server 240 retrieves the directionally enhanced audio signal from a database or receives it from another system, e.g., the audio system of the headset 210. The audio server 240 determines an SNR improvement value of the acoustic sensor array based in part on the enhanced audio signal from the acoustic sensor array and an audio signal from an acoustic sensor of the acoustic sensor array. The audio server 240 then determines a spatial acoustic parameter based in part on the SNR improvement value by using a model that maps SNR improvement values to spatial acoustic parameters. The audio server 240 also determines a temporal acoustic parameter based in part on the audio signals. The audio server 240 then uses the spatial and temporal acoustic parameters to determine the composite acoustic parameter value. In some embodiments, the composite acoustic parameter value is a weighted aggregation of the spatial and temporal acoustic parameters.

The audio server 240 can use the composite acoustic parameter value to determine other acoustic parameters. Examples of the other acoustic parameters include a reverberation time from the sound source of the audio content to the headset 210 for each of a plurality of frequency bands, a reverberant level for each frequency band, a direct to reverberant ratio for each frequency band, a direction of a direct sound from the sound source to the headset, an amplitude of the direct sound for each frequency band, a propagation time for the direct sound from the sound source to the headset, relative linear and angular velocities between the sound source and headset, a time of early reflection of a sound from the sound source to the headset 210, an amplitude of early reflection for each frequency band, a direction of early reflection, room mode frequencies, and room mode features (e.g., peaks, troughs, anti-nodes, nodes etc.). In some embodiments, the acoustic parameters parametrize impulse responses from the virtual sound source 263 to the headset 210 in the room 230.

The audio server 240 can provide the composite acoustic parameter value and/or the other acoustic parameters to the audio system on the headset 210 for rendering the spatialized sound 267. The audio server 240 can also use the composite acoustic parameter value and/or the other acoustic parameters to update a virtual model of the room 230 that describes one or more physical spaces and acoustic properties of physical spaces within the room 230. The acoustic properties include values of one or more material acoustic parameters determined by the audio server 240 for those physical spaces. The acoustic properties can also include acoustic parameters of those spaces, which are determined based on the values of the material acoustic parameter of those spaces.

The audio server 240 may determine the virtual propagation paths of the spatialized sound 267 based on information from the updated virtual model and provide the virtual propagation paths to the headset 210 for rendering the spatialized sound 267.

Figure 3:
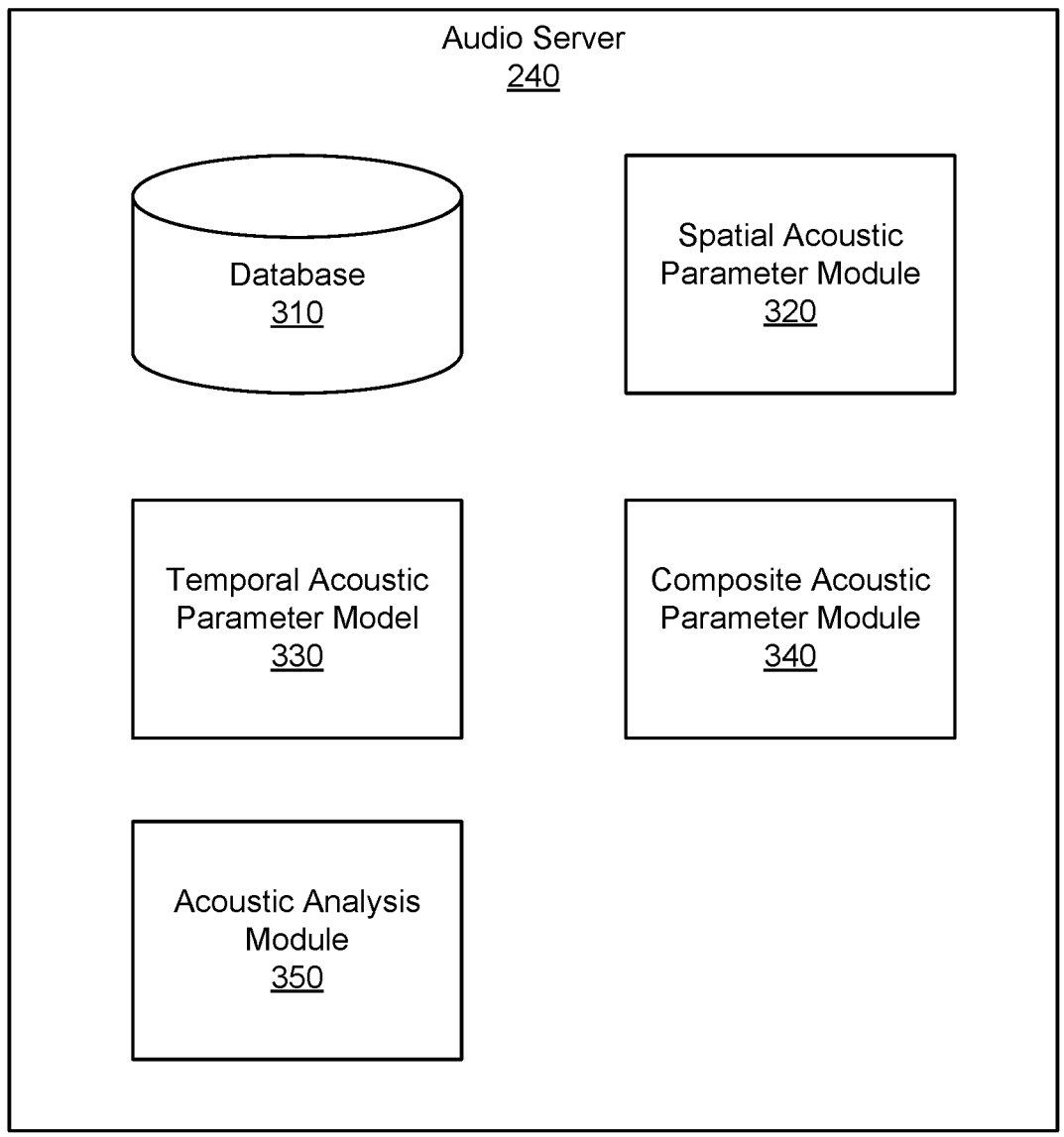
FIG. 3 is a block diagram of an audio server, in accordance with one or more embodiments.

FIG. 3 is a block diagram of the audio server 240, in accordance with one or more embodiments. The audio server 240 can determine a composite acoustic parameter value of the room 330 that can be used for presentation of audio content by the headset 310. The audio server 240 includes a database 310, a spatial acoustic parameter module 320, a temporal acoustic parameter module 330, a composite acoustic parameter value module 340, and an acoustic filter module 350. In other embodiments, the audio server 240 can have any combination of the modules listed with any additional modules. In some other embodiments, the audio server 240 includes one or more modules that combine functions of the modules illustrated in FIG. 3. One or more processors of the audio server 240 (not shown) may run some or all of the modules within the audio server 240.

The database 310 stores data for the audio server 240. The stored data may include, e.g., SNR improvement values of one or more acoustic sensor arrays (e.g., the acoustic sensor array of the headset 210), SNR values of audio signals, a model mapping SNR improvement values of acoustic sensor arrays to spatial acoustic parameters, temporal acoustic parameters, composite acoustic parameters, or some combination thereof. The stored data may also include a virtual model of a local area (e.g., the room 330), acoustic parameters for various materials described by the virtual model, acoustic parameters for locations described by the virtual model, target reverberation times for locations in the virtual model, HRTFs for various users, audio data, visual information (depth information, color information, etc.) of the local area, location information of a headset (e.g., the headset 310), information of audio content, information of sound sources, some other information that may be used by the audio server 240, or some combination thereof.

A particular location in the virtual model may correspond to a current physical location of the headset within the local area. Each location in the virtual model is associated with a set of acoustic parameters for a corresponding physical space that represents one configuration of the local area. The set of acoustic parameters of a location describes various acoustic properties of that one particular configuration of the local area. In some embodiments, the physical spaces whose acoustic properties are described in the virtual model include, but are not limited to, a room (e.g., a conference room, a bathroom, a hallway, an office, a bedroom, a dining room, a living room, etc.), an open space (e.g., an open amphitheater, field, etc.), other types of space, or some combination thereof. In some embodiments, the physical spaces can be certain outside spaces (e.g., patio, garden, etc.) or combination of various inside and outside spaces. Acoustic parameters of the room 330 can be retrieved from the virtual model based on a location of the virtual model obtained from the headset 310.

The model mapping of SNR improvement values of acoustic sensor arrays to spatial acoustic parameters may be generated based on acoustic measurements. For instance, an SNR improvement value of an acoustic sensor array is determined based on a directionally enhanced audio signal from the acoustic sensor array and an audio signal from an acoustic sensor in the acoustic sensor array. The SNR improvement value measures a difference between a SNR value of the directionally enhanced audio signal and a SNR value of the audio signal from the acoustic sensor. And a spatial acoustic parameter is measured for each of a group of SNR improvement values. In some embodiments, the model is a function that describes a relationship between the SNR improvement values and the measured spatial acoustic parameters. The model can be a machine learning model that is trained based on a training set that includes a plurality of pairs of SNR improvement values and spatial acoustic parameters. Each pair includes a SNR improvement values and a corresponding spatial acoustic parameter. The spatial acoustic parameter module 320 uses machine learning to train the machine learning model. Different machine learning techniques—such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps—may be used in different embodiments.

The spatial acoustic parameter module 320 determines a spatial acoustic parameter of the local area based on a directionally enhanced audio signal. In some embodiments, the spatial acoustic parameter module 320 obtains the directionally enhanced audio signal from an acoustic sensor array in which a spatial signal enhancement filter is built. The acoustic sensor array can be an acoustic array implemented on a headset (e.g., the acoustic sensor array 220) or an acoustic sensor array separate from a headset. The spatial signal enhancement filter can be the beamforming module 270.

The spatial acoustic parameter module 320 directs the spatial signal enhancement filter. For example, the spatial acoustic parameter module 320 obtains location information of a sound source. The spatial acoustic parameter module 320 then directs the spatial signal enhancement filter at the sound source based on the obtained location information. The spatial acoustic parameter module 320 may receive the location information of the sound source from an audio controller, e.g., the audio controller 230. The spatial acoustic parameter module 320 can determine a steering vector based on the location information. Then the spatial acoustic parameter module 320 provides the steering vector to the audio controller for the audio controller to direct the spatial signal enhancement filter.

The spatial acoustic parameter module 320 determines a SNR improvement value of the acoustic sensor array. The spatial acoustic parameter module 320 receives a directionally enhanced audio signal from the acoustic sensor array and an audio signal from an individual acoustic sensor of the acoustic sensory array. The spatial acoustic parameter module 320 determines a SNR value of the directionally enhanced audio signal and a SNR value of the audio signal from the acoustic sensor. The SNR improvement value is the difference between the two SNR values, e.g., a ratio of the SNR value of the directionally enhanced audio signal to a SNR value of the audio signal from the acoustic sensor, or the SNR value of the directionally enhanced audio signal minus a SNR value of the audio signal from the acoustic sensor. The directionally enhanced audio signal includes a direction component and may also include an early reflection component. The audio signal from the acoustic sensor includes a late reflection component in addition to the direct and early reflection component. Thus, the SNR improvement value correlates to DRR, to ELR, or both. In some embodiment, the SNR improvement value is a ratio of the enhanced audio signal to the audio signal from the acoustic sensor or a value measuring a difference between the enhanced audio signal and the audio signal from the acoustic sensor.

The spatial acoustic parameter module 320 then determines the spatial acoustic parameter based on the SNR improvement value. The spatial acoustic parameter module 320 inputs the SNR improvement value into the model mapping SNR improvement values to spatial acoustic parameters and the model outputs the spatial acoustic parameter. In some embodiments, the spatial acoustic parameter module 320 can use the SNR improvement value and the spatial acoustic parameter to improve or further train the machine learning model.

The temporal acoustic parameter module 330 obtains a temporal acoustic parameter. The temporal acoustic parameter module 330 may retrieve the temporal acoustic parameter from the database 310 or determines the temporal acoustic parameter based on acoustic data of the local area, such as acoustic data measured by an audio system of a headset. In some embodiments, the temporal acoustic parameter module 330 determines the temporal acoustic parameter based on an impulse response of the local area, e.g., by examining onset and decay characteristics of the impulse response.

The composite acoustic parameter value module 340 determines the composite acoustic parameter value based on the spatial acoustic parameter and temporal acoustic parameter. In some embodiments, the composite acoustic parameter value module 340 assigns a spatial weight to the spatial acoustic parameter and a temporal weight to the temporal acoustic parameter. The spatial weight and temporal weight can be determined based on a size of the local area, a number of acoustic sensors in the acoustic sensor array, computed confidence values for the spatial acoustic parameter and temporal acoustic parameter, the signal-to-noise ratio of the directionally enhanced audio signal, the SNR improvement value, a white-noise gain, a number of sound sources in the local area, types of noises in the local area, a type of the local area (e.g., room, park, restaurant, etc.), a speed of movement of the acoustic sensor array, an orientation of the acoustic sensor array, one or more qualities of the acoustic sensors in the acoustic sensor array (e.g., sensor self-noise, quantization errors, etc.), a temporal sampling rate (also referred as "temporal sampling frequency"), spatial positions of the acoustic sensors relative to each other on the acoustic sensor array, spatial aliasing frequency, other factors, or some combination thereof.

The composite acoustic parameter value module 340 aggregates the spatial acoustic parameter and temporal acoustic parameter based on the spatial weight and temporal weight. For instance, the composite acoustic parameter value module 340 determines that the composite acoustic parameter value is a sum of a product of the spatial acoustic parameter and the spatial weight and a product of the temporal acoustic parameter and the temporal weight. In some embodiments, the composite acoustic parameter value is an average of the spatial acoustic parameter and the temporal acoustic parameter.

In some embodiments, the composite acoustic parameter value module 340 determines whether the spatial weight is above a threshold value. In response to a determination that the spatial weight is above the threshold value, the composite acoustic parameter value module 340 assigns the spatial acoustic parameter as the composite acoustic parameter. This way, it may not be necessary to determine the temporal acoustic parameter or the temporal weight so that computing resources and power can be saved. In some other embodiments, the composite acoustic parameter value module 340 determines whether the temporal weight is above the threshold value. In response to the temporal weight being above the threshold value, the composite acoustic parameter value module 340 assigns the temporal acoustic parameter as the composite acoustic parameter and determines not to calculate the spatial acoustic parameter or the spatial weight to save computing resources and power.

In some embodiments, the spatial acoustic parameter, temporal acoustic parameter, spatial weight, temporal weight, and/or composite acoustic parameter can be specific to a frequency. A spatial acoustic parameter, temporal acoustic parameter, spatial weight, temporal weight, and composite acoustic parameter may be determined for each of a plurality of frequencies.

The acoustic analysis module 340 can use the composite acoustic parameter value to update the virtual model of the local area. The acoustic analysis module 340 can also use the composite acoustic parameter value and/or the updated virtual model to determine one or more other acoustic parameters. The acoustic analysis module 340 can provide information from the updated virtual model and/or the acoustic parameters to a headset for adjusting audio content to be presented to a user, e.g., rendering spatialized audio content. The acoustic analysis module 340 can also use the updated virtual model to determine sound propagation paths (e.g., direct sound path, early reflection sound paths, or late reflection sound paths) for spatialized audio content within the local area and transmit the sound propagation paths to the headset for rendering the audio content.

Figure 4:
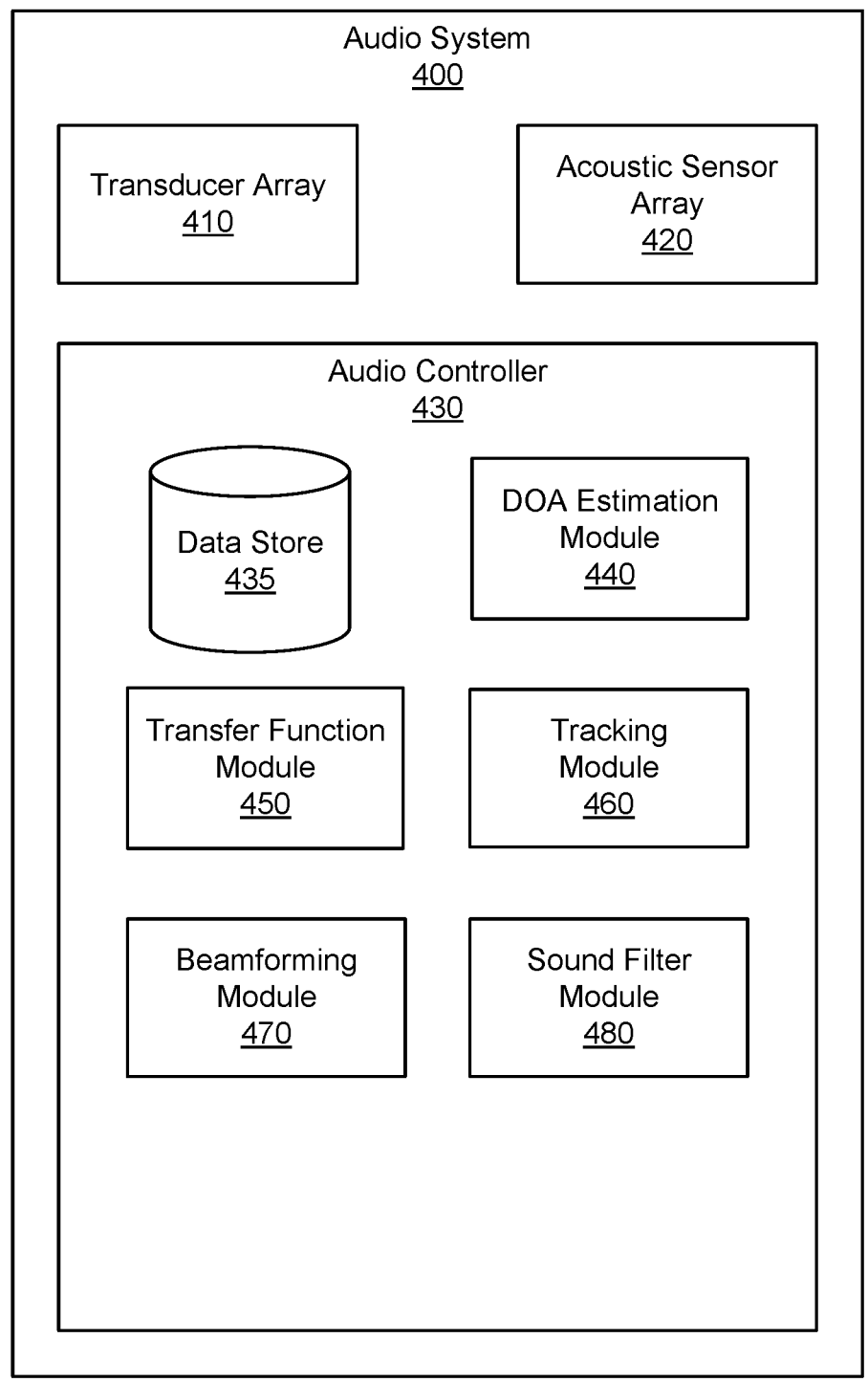
FIG. 4 is a block diagram of an audio system, in accordance with one or more embodiments.

FIG. 4 is a block diagram of an audio system 400, in accordance with one or more embodiments. The audio system of the headset 100 may be an embodiment of the audio system 400. The audio system 400 generates one or more acoustic transfer functions for a user. The audio system 400 may then use the one or more acoustic transfer functions to generate audio content for the user. In the embodiment of FIG. 4, the audio system 400 includes a transducer array 410, a sensor array 420 (also referred as "acoustic sensor array"), and an audio controller 430. Some embodiments of the audio system 400 have different components than those described here. Similarly, in some cases, functions can be distributed among the components in a different manner than is described here. In some embodiments, some or all of the functionality of an audio server (e.g., the audio server 240) may be performed by the audio system 400.

The transducer array 410 is configured to present audio content. The transducer array 410 includes a plurality of transducers. A transducer, such as a playback transducer or output transducer, is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 410 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 410 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 430, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 410 generates audio content in accordance with instructions from the audio controller 430. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 400. The transducer array 410 may be coupled to a wearable device (e.g., the headset 100 or the headset 105). In alternate embodiments, the transducer array 410 may be a plurality of speakers that are separate from the wearable device (e.g., coupled to an external console).

The sensor array 420 detects sounds within a local area surrounding the sensor array 420. The sensor array 420 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 420 is configured to monitor the audio content generated by the transducer array 410 using at least some of the plurality of acoustic sensors. Increasing the number of sensors may improve the accuracy of information (e.g., directionality) describing a sound field produced by the transducer array 410 and/or sound from the local area.

The audio controller 430 controls operation of the audio system 400. In the embodiment of FIG. 4, the audio controller 430 includes a data store 435, a DOA estimation module 440, a transfer function module 450, a tracking module 460, a beamforming module 470, and a sound filter module 480. The audio controller 430 may be located inside a headset, in some embodiments. Some embodiments of the audio controller 430 have different components than those described here. Similarly, functions can be distributed among the components in different manners than described here. For example, some functions of the controller may be performed external to the headset. The user may opt in to allow the audio controller 430 to transmit data captured by the headset to systems external to the headset, and the user may select privacy settings controlling access to any such data.

The data store 435 stores data for use by the audio system 400. Data in the data store 435 includes acoustic parameters of the local area of the audio system 400, including, e.g., a DRR for each frequency band, an ELR for each frequency band, a reverberation time from a sound source to the headset for each of a plurality of frequency bands, a reverberant level for each frequency band, a direction of a direct sound from the sound source to the headset, an amplitude of the direct sound for each frequency band, a propagation time for the direct sound from the sound source to the headset, relative linear and angular velocities between the sound source and headset, a time of early reflection of a sound from the sound source to the headset, an amplitude of early reflection for each frequency band, a direction of early reflection, room mode frequencies, room mode locations, some other parameters that define acoustic properties of the local area, or some combination thereof. Data in the data store 435 may also include sounds recorded in the local area of the audio system 400, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 400, or any combination thereof.

The DOA estimation module 440 is configured to localize sound sources in the local area based in part on information from the sensor array 420. Localization is a process of determining where sound sources are located relative to the user of the audio system 400. The DOA estimation module 440 performs a DOA analysis to localize one or more sound sources within the local area. The DOA analysis may include analyzing the intensity, spectra, and/or arrival time of each sound at the sensor array 420 to determine the direction from which the sounds originated. In some cases, the DOA analysis may include any suitable algorithm for analyzing a surrounding acoustic environment in which the audio system 400 is located.

For example, the DOA analysis may be designed to receive input signals from the sensor array 420 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 420 received the direct-path audio signal. The determined angle may then be used to identify the DOA for the received input signal. Other algorithms not listed above may also be used alone or in combination with the above algorithms to determine DOA.

In some embodiments, the DOA estimation module 440 may also determine the DOA with respect to an absolute position of the audio system 400 within the local area. The position of the sensor array 420 may be received from an external system (e.g., some other component of a headset, an artificial reality console, an audio server, a position sensor (e.g., the position sensor 190), etc.). The external system may create a virtual model of the local area, in which the local area and the position of the audio system 400 are mapped. The received position information may include a location and/or an orientation of some or all of the audio system 400 (e.g., of the sensor array 420). The DOA estimation module 440 may update the estimated DOA based on the received position information.

The transfer function module 450 is configured to generate one or more acoustic transfer functions. Generally, a transfer function is a mathematical function giving a corresponding output value for each possible input value. Based on parameters of the detected sounds, the transfer function module 450 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a sound source in space.

An ATF includes a number of transfer functions that characterize a relationship between the sound source and the corresponding sound received by the acoustic sensors in the sensor array 420. Accordingly, for a sound source there is a corresponding transfer function for each of the acoustic sensors in the sensor array 420. And collectively the set of transfer functions is referred to as an ATF. Accordingly, for each sound source there is a corresponding ATF. Note that the sound source may be, e.g., someone or something generating sound in the local area, the user, or one or more transducers of the transducer array 410. The ATF for a particular sound source location relative to the sensor array 420 may differ from user to user due to a person's anatomy (e.g., ear shape, shoulders, etc.) that affects the sound as it travels to the person's ears. Accordingly, the ATFs of the sensor array 420 are personalized for each user of the audio system 400.

In some embodiments, the transfer function module 450 determines one or more HRTFs for a user of the audio system 400. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 450 may determine HRTFs for the user using a calibration process. In some embodiments, the transfer function module 450 may provide information about the user to a remote system. The user may adjust privacy settings to allow or prevent the transfer function module 450 from providing the information about the user to any remote systems. The remote system determines a set of HRTFs that are customized to the user using, e.g., machine learning, and provides the customized set of HRTFs to the audio system 400.

The tracking module 460 is configured to track locations of one or more sound sources. The tracking module 460 may compare current DOA estimates and compare them with a stored history of previous DOA estimates. In some embodiments, the audio system 400 may recalculate DOA estimates on a periodic schedule, such as once per second, or once per millisecond. The tracking module may compare the current DOA estimates with previous DOA estimates, and in response to a change in a DOA estimate for a sound source, the tracking module 460 may determine that the sound source moved. In some embodiments, the tracking module 460 may detect a change in location based on visual information received from the headset or some other external source. The tracking module 460 may track the movement of one or more sound sources over time. The tracking module 460 may store values for a number of sound sources and a location of each sound source at each point in time. In response to a change in a value of the number or locations of the sound sources, the tracking module 460 may determine that a sound source moved. The tracking module 460 may calculate an estimate of the localization variance. The localization variance may be used as a confidence level for each determination of a change in movement.

The beamforming module 470 is configured to process one or more ATFs to selectively emphasize sounds from sound sources within a certain area while de-emphasizing sounds from other areas. In analyzing sounds detected by the sensor array 420, the beamforming module 470 may combine information from different acoustic sensors to emphasize sound associated from a particular region of the local area while deemphasizing sound that is from outside of the region. For instance, the beamforming module 470 combines information from acoustic sensors of a sensor array (e.g., the sensor array described above in conjunction with FIG. 1) to emphasize sound from a sound source in the local area.

The beamforming module 470 may isolate an audio signal associated with sound from a particular sound source or from other sound sources in the local area based on, e.g., different DOA estimates from the DOA estimation module 440 and the tracking module 460. The beamforming module 470 may thus selectively analyze discrete sound sources in the local area. In some embodiments, the beamforming module 470 may enhance a signal from a sound source. For example, the beamforming module 470 may apply sound filters (e.g., spatial signal enhancement filters) which eliminate signals above, below, or between certain frequencies.

A spatial signal enhancement filter can be directed at a given identified sound source to enhance sounds associated with the given identified sound source relative to other sounds detected by the sensor array 420. The spatial signal enhancement filter may be directed at the sound source by adapting a steering vector of the spatial signal enhancement filter based on a location of the sound source determined by the tracking module 460. In some embodiments, the audio system 400 sends the location of the sound source to an audio server (e.g., the audio server 240), which generates an instruction for steering the spatial signal enhancement filter based on the location of the sound source. The audio system 400 receives the instruction from the audio system 400. Based on the instruction, the audio system 400 directs spatial signal enhancement filter at the sound source. In some other embodiments, the audio system 400 directs spatial signal enhancement filter at the sound source based on the location of the sound source.

The directed spatial signal enhancement filter combines audio signals from the acoustic sensors in the sensor array to generate an audio signal that is enhanced in the direction from the sound source to the sensor array or an audio signal that is originated from the sound source in the direction (referred as "directionally enhanced audio signal"). The directionally enhanced audio signal includes a direction component that corresponds to audio signal propagating through a direct path from the sound source to the acoustic sensor without reflection. The directionally enhanced audio signal may also include an early reflection component that corresponds to the first order acoustic reflections from surfaces in the local area that are close to the sound source. The audio signal from each acoustic sensor of the sensor array (referred as "individual audio signal") is not directionally enhanced. An individual audio signal includes a direct component, an early reflection component, and a late reflection component that corresponds to the first order acoustic reflections from farther surfaces or higher order acoustic reflections.

The sound filter module 480 determines sound filters for the transducer array 410. In some embodiments, the sound filters cause the audio content to be spatialized, such that the audio content appears to originate from a target region. The sound filter module 480 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 480 calculates one or more of the acoustic parameters. In some embodiments, the sound filter module 480 requests the acoustic parameters from an audio server (e.g., as described below with regard to FIG. 6).

The sound filter module 480 provides the sound filters to the transducer array 410. In some embodiments, the sound filters may cause positive or negative amplification of sounds as a function of frequency.

FIG. 5 is a flowchart illustrating a method 500 of determining a composite acoustic parameter value, in accordance with one or more embodiments. The process 500 of FIG. 5 may be performed by the components of an apparatus, e.g., the audio server 240. Other entities (e.g., the audio system 400) may perform some or all of the steps of the process in other embodiments. Likewise, embodiments may include different and/or additional steps, or perform the steps in different orders.

The audio server obtains 510 a directionally enhanced audio signal. The directionally enhanced audio signal is generated using audio signals from an acoustic sensor array. The acoustic sensor array includes a plurality of acoustic sensors, and each of the audio signal can be an audio signal from one of the acoustic sensors of the acoustic sensor array. The sound source projects a sound into a local area and can be identified based on the sound, e.g., by an audio system of a headset. The spatial signal enhancement filter is a filter applied to audio signals captured by the acoustic sensor array. The audio server can set up the spatial signal enhancement filter so that the spatial signal enhancement filter is directed at the sound source, e.g., by a beamforming module of an audio system. For example, the audio server receives information describing a location of the sound source in the local area and provides instruction to the audio system to direct the spatial signal enhancement filter at the sound source based on the received information. The directed spatial signal enhancement filter combines the audio signals from the acoustic sensor array to enhance sound in the direction from the sound source to the acoustic sensor array. The directionally enhanced audio signal includes a direct component or an early reflection component.

The audio server determines 520 a SNR improvement value of the acoustic sensor array based in part on the directionally enhanced audio signal and an audio signal from an acoustic sensor of the acoustic sensor array. The audio signal from the acoustic sensor of the acoustic sensor array is not directionally enhanced and includes late reflection components. The SNR improvement value indicates a difference between a SNR value of the directionally enhanced audio signal and a SNR value of the audio signal from the acoustic sensor. The SRN value of the directionally enhanced audio signal is higher than the SNR value of the audio signal from the acoustic sensor, meaning the acoustic sensor array provides SNR improvement, compared with a single acoustic sensor. An embodiment of the SNR improvement value is a ratio of the enhanced audio signal to the audio signal from the acoustic sensor.

The audio server determines 530 a spatial acoustic parameter based in part on the SNR improvement value and a model that maps SNR improvement values to spatial acoustic parameters. For example, the audio server inputs the SNR improvement value into the model, the model outputs the spatial acoustic parameter. The model can be a function or curve that describes a relationship between SNR improvement values and spatial acoustic parameters. The model can also be a machine learning model trained based on a plurality of SNR improvement values and a plurality of spatial acoustic parameters, each of the plurality of spatial acoustic parameters corresponding to one of the plurality of SNR improvement values.

The audio server determines 540 a temporal acoustic parameter based in part on the audio signals. The audio server determines 550 a composite acoustic parameter value based in part on the spatial acoustic parameter and a temporal acoustic parameter value. For instance, the audio server determines a spatial weight for the spatial acoustic parameter and a temporal weight for the temporal acoustic parameter. Then the audio server aggregates the spatial acoustic parameter and the temporal acoustic parameter based on the spatial weight and temporal weight. At least one of the spatial weight and the temporal weight is determined based on a size of the local area, a number of acoustic sensors in the acoustic a sensor array, or a combination of both.

The composite acoustic parameter value is a value of DRR or ELR. Audio content presented to a user is adjusted based in part on the composite acoustic parameter value. In some embodiments, the audio server determines a value of a room acoustic parameter based on the composite acoustic parameter value. The audio content can be adjusted based in part on the room acoustic parameter. The audio server may update a virtual model of the local area based on the composite acoustic parameter and/or the room acoustic parameter.

System Environment

Figure 6:
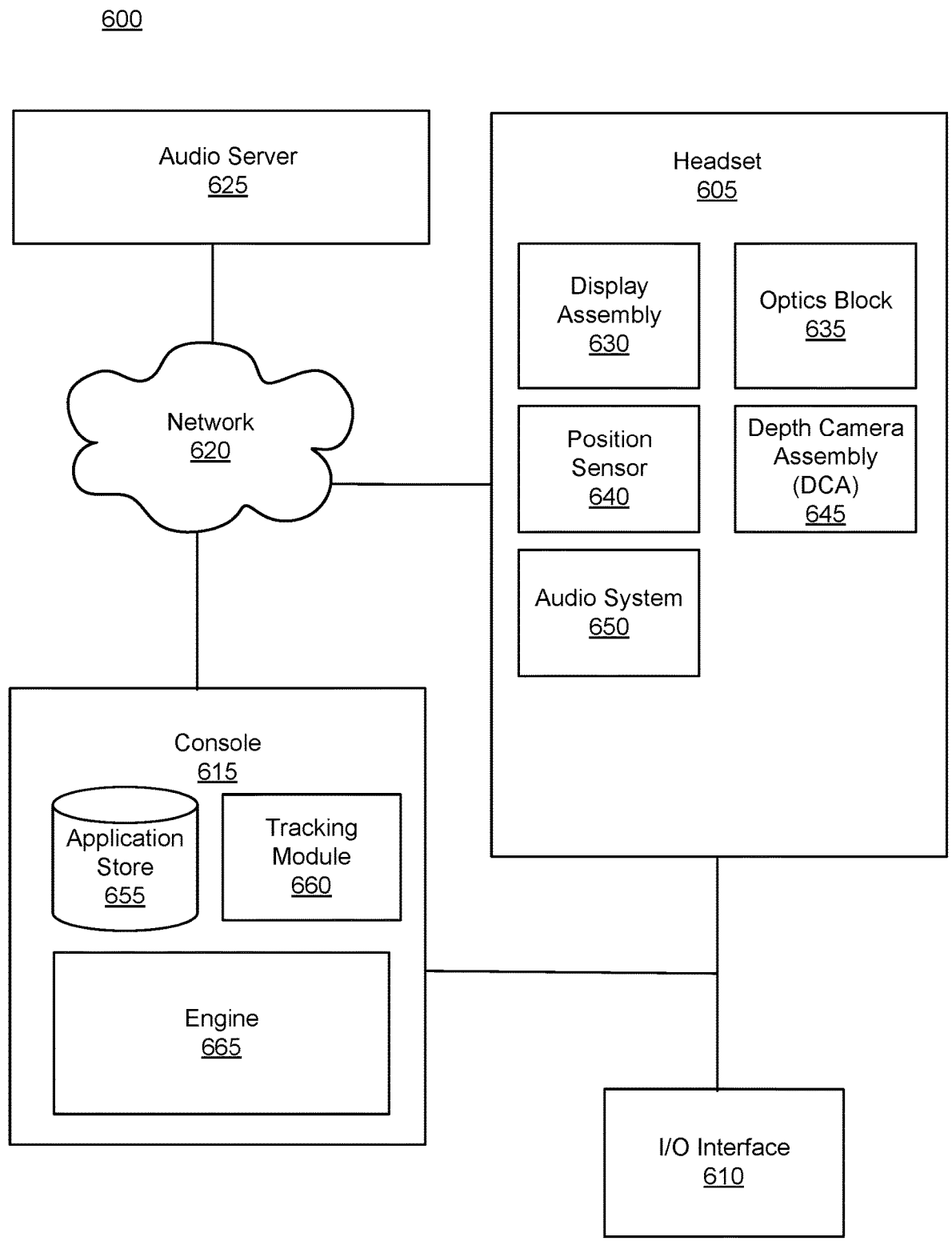
FIG. 6 is a block diagram of a system that includes a headset and an audio server, in accordance with one or more embodiments.

FIG. 6 is a block diagram of a system 600 that includes a headset 605 and a audio server 625, in accordance with one or more embodiments. In some embodiments, the headset 605 may be the headset 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the network 620, and the audio server 625. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 630, an optics block 635, one or more position sensors 640, and the DCA 645. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUS, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for a portion of the local area. The DCA includes one or more imaging devices and a DCA controller. The DCA 645 may also include an illuminator. Operation and structure of the DCA 645 is described above with regard to FIG. 1A.

The audio system 650 provides audio content to a user of the headset 605. The audio system 650 is substantially the same as the audio system 200 describe above. The audio system 650 may comprise one or acoustic sensors, one or more transducers, and an audio controller. The audio system 650 may provide spatialized audio content to the user. In some embodiments, the audio system 650 may request acoustic parameters from the audio server 625 over the network 620. The acoustic parameters describe one or more acoustic properties (e.g., room impulse response, a reverberation time, a reverberation level, etc.) of the local area. The audio system 650 may provide information describing at least a portion of the local area from e.g., the DCA 645 and/or location information for the headset 605 from the position sensor 640. The audio system 650 may generate one or more sound filters using one or more of the acoustic parameters received from the audio server 625, and use the sound filters to provide audio content to the user.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615 to the audio server 625. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The audio server 625 may include a database that stores a virtual model describing a plurality of spaces, wherein one location in the virtual model corresponds to a current configuration of a local area of the headset 605. The audio server 625 determines, based on information received from the headset 605 (such as visual information or location information), a location in the virtual model that is associated with the local area of the headset 605. The audio server 625 determines (e.g., retrieves) one or more acoustic parameters associated with the local area, based in part on the determined location in the virtual model and any acoustic parameters associated with the determined location.

For instance, the audio server 625 determines a composite acoustic parameter value associated with the local area based on audio signals received from the audio system 650 of the headset 605. The composite acoustic parameter value can be a value of DRR or ELR. In some embodiment, the composite acoustic parameter value is an aggregation of a spatial acoustic parameter and a temporal acoustic parameter. The audio server 625 determines the spatial acoustic parameter by determining a SNR improvement value based on a directionally enhanced audio signal, which is a combination of the audio signals from an acoustic sensor array, and an audio signal from one acoustic sensor of the acoustic sensor array. The audio server 625 also determines the temporal acoustic parameter based in part on the audio signals.

The audio server 625 may use the composite acoustic parameter value to update the virtual model or other acoustic parameters associated with the local area. The audio server 625 may transmit the location of the local area, information from the updated virtual model, and/or any values of acoustic parameters associated with the local area to the headset 605. The headset 605 can use information from the audio server 625 to render audio content.

The user may adjust privacy settings to allow or prevent the headset 605 from transmitting information to the audio server 625. One or more components of system 600 may contain a privacy module that stores one or more privacy settings for user data elements. The user data elements describe the user or the headset 605. For example, the user data elements may describe a physical characteristic of the user, an action performed by the user, a location of the user of the headset 605, a location of the headset 605, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 600 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
obtaining a directionally enhanced audio signal generated using audio signals from an acoustic sensor array;
determining a signal-to-noise ratio (SNR) improvement value of the acoustic sensor array based in part on the directionally enhanced audio signal and an audio signal from an acoustic sensor of the acoustic sensor array;
determining a spatial acoustic parameter based in part on the SNR improvement value and a model that maps SNR improvement values to spatial acoustic parameters;
determining a temporal acoustic parameter based in part on the audio signals; and
determining a composite acoustic parameter value based in part on the spatial acoustic parameter and a temporal acoustic parameter value, wherein audio content presented to a user is adjusted based in part on the composite acoustic parameter value.

2. The method of claim 1, wherein the composite acoustic parameter value is a value of an early-to late ratio or a direct-to-reverberant ratio.

3. The method of claim 1, wherein obtaining the directionally enhanced audio signal generated using the audio signals from the acoustic sensor array comprises:
receiving information describing a location of the sound source in the local area; and
providing instruction to an audio system to configure the spatial signal enhancement filter to emphasize sound from the sound source based on the received information.

4. The method of claim 1, wherein the directionally enhanced audio signal includes at least one of a direct sound component and an early reflection component.

5. The method of claim 1, wherein the audio signal from the acoustic sensor of the acoustic sensor array includes a late reflection component.

6. The method of claim 1, wherein the model is a machine learning model trained based on a plurality of SNR improvement values and a plurality of spatial acoustic parameters, each of the plurality of spatial acoustic parameters corresponding to one of the plurality of SNR improvement values.

7. The method of claim 1, further comprising:
determining a value of a room acoustic parameter based on the composite acoustic parameter value,
wherein the audio content presented to the user is adjusted based in part on the room acoustic parameter.

8. The method of claim 1, further comprising:
updating a virtual model of the local area based on the composite acoustic parameter.

9. The method of claim 1, wherein determining a composite acoustic parameter value based in part on the spatial acoustic parameter and a temporal acoustic parameter value comprises:
determining a spatial weight for the spatial acoustic parameter;

determining a temporal weight for the temporal acoustic parameter; and aggregating the spatial acoustic parameter and the temporal acoustic parameter based on the spatial weight and temporal weight.

10. The method of claim 9, wherein at least one of the spatial weight and the temporal weight is determined based on a size of the local area, a number of acoustic sensors in the acoustic, or a combination of both.

11. A method comprising:

obtaining a directionally enhanced audio signal generated using audio signals from an acoustic sensor array;

determining a composite acoustic parameter value based in part on a spatial acoustic parameter and a temporal acoustic parameter, wherein the spatial acoustic parameter is determined based in part on the directionally enhanced audio signal and an audio signal of an acoustic sensor of the acoustic sensor array, and the temporal acoustic parameter is determined based in part on an impulse response of a local area;

adjusting audio content based in part on the composite acoustic parameter value; and presenting the adjusted audio content to a user.

12. The method of claim 11, wherein determining the composite acoustic parameter value based in part on the spatial acoustic parameter and the temporal acoustic parameter value comprises:

determining a signal-to-noise ratio (SNR) improvement value of the acoustic sensor array based in part on the directionally enhanced audio signal and the audio signal from the acoustic sensor of the acoustic sensor array; and determining the spatial acoustic parameter based in part on the SNR improvement value and a model that maps SNR improvement values to spatial acoustic parameters.

13. The method of claim 11, wherein determining the composite acoustic parameter value based in part on the spatial acoustic parameter and the temporal acoustic parameter value comprises:

providing the directionally enhanced audio signal and the audio signal from the acoustic sensor of the acoustic sensor array to an audio server, the audio server configured to determine the composite acoustic parameter value based in part on the spatial acoustic parameter and the temporal acoustic parameter value; and receiving the composite acoustic parameter from the audio server.

14. The method of claim 11, wherein adjusting the audio content based in part on the composite acoustic parameter value comprises:

adjusting the audio content based in part on the composite acoustic parameter value such that the audio content appears to the user as originating from a sound source in the local area.

15. The method of claim 11, wherein the composite acoustic parameter value is a value of an early-to late ratio or a direct-to-reverberant ratio.

16. The method of claim 11, further comprising:

determine a value of a room acoustic parameter based on the composite acoustic parameter value, wherein adjusting the audio content based in part on the composite acoustic parameter value comprises adjusting the audio content based on the composite acoustic parameter value and the value of the room acoustic parameter.

17. The method of claim 11, wherein obtaining the directionally enhanced audio signal generated using the audio signals from the acoustic sensor array comprises:

obtaining information describing a location of the sound source in the local area; and configuring the spatial signal enhancement filter to emphasize sound from the sound source based on the received information.

18. The method of claim 11, wherein determining the composite acoustic parameter value based in part on the spatial acoustic parameter and the temporal acoustic parameter value comprises:

determining a spatial weight for the spatial acoustic parameter;

determining a temporal weight for the temporal acoustic parameter; and aggregating the spatial acoustic parameter and the temporal acoustic parameter based on the spatial weight and temporal weight.

19. The method of claim 18, wherein at least one of the spatial weight and the temporal weight is determined based on a size of the local area, a number of acoustic sensors in the acoustic a sensor array, compute confidence values of the spatial acoustic parameter and the temporal acoustic parameter, a signal-to-noise ratio of the directionally enhanced audio signal, the SNR improvement value, a white-noise gain, a number of sound sources in the local area, types of noises in the environment, a type of the local area, a speed of movement of the acoustic sensor array, an orientation of the acoustic sensor array, one or more qualities of acoustic sensors in the acoustic sensor array, a temporal sampling rate, spatial position of acoustic sensors on the acoustic sensor array, a spatial aliasing frequency, or some combination thereof.

20. A non-transitory computer-readable storage medium having instructions encoded thereon that, when executed by a processor, cause the processor to:

obtain a directionally enhanced audio signal generated based on audio signals from an acoustic sensor array;

determine a signal-to-noise ratio (SNR) value of the acoustic sensor array based in part on the directionally enhanced audio signal and an audio signal from an acoustic sensor of the acoustic sensor array;

determine a spatial acoustic parameter based in part on the SNR improvement value and a model that maps SNR improvement values to spatial acoustic parameters;

determine a temporal acoustic parameter based in part on the audio signals; and determine a composite acoustic parameter value based in part on the spatial acoustic parameter and a temporal acoustic parameter value, wherein audio content presented to a user is adjusted based in part on the composite acoustic parameter value.

* * * * *